(12) United States Patent
Citak

(10) Patent No.: US 11,659,816 B2
(45) Date of Patent: May 30, 2023

(54) TOY FOR DOMESTIC PETS

(71) Applicant: Andrzej Citak, Raasdorf (AT)

(72) Inventor: Andrzej Citak, Raasdorf (AT)

(73) Assignee: Andrzej Citak, Raasdorf (AT)

( * ) Notice: Subject to any disclaimer, the term of this patent is extended or adjusted under 35 U.S.C. 154(b) by 335 days.

(21) Appl. No.: 17/257,242

(22) PCT Filed: Oct. 15, 2018

(86) PCT No.: PCT/AT2018/060243
§ 371 (c)(1),
(2) Date: Dec. 30, 2020

(87) PCT Pub. No.: WO2020/006585
PCT Pub. Date: Jan. 9, 2020

(65) Prior Publication Data
US 2021/0127637 A1    May 6, 2021

(30) Foreign Application Priority Data

Jul. 2, 2018 (AT) .............................. A 50567/2018

(51) Int. Cl.
*A01K 15/02* (2006.01)
*A01K 5/01* (2006.01)
(Continued)

(52) U.S. Cl.
CPC .......... *A01K 15/026* (2013.01); *A01K 5/0114* (2013.01); *A63F 3/00261* (2013.01);
(Continued)

(58) Field of Classification Search
CPC .. A01K 15/026; A01K 15/025; A01K 5/0114; A63F 3/00261; A63F 2003/00337;
(Continued)

(56) References Cited

FOREIGN PATENT DOCUMENTS

| AT | 513156 B1 | * | 2/2014 | .......... A01K 15/025 |
| AT | 518643 A4 | * | 12/2017 | .......... A01K 15/025 |

(Continued)

*Primary Examiner* — Trinh T Nguyen
(74) *Attorney, Agent, or Firm* — Maschoff Brennan

(57) ABSTRACT

The invention refers to a toy for pets, in particular for dogs, comprising a housing (3) with a floor (5), a lid (7) and side walls (6) with openings (31, 32), through which, in the housing (3), at least one longitudinal sliding element (1) and at least one transversal sliding element (2) are placed in a movable manner, wherein, in a first closed position, the sliding element (1, 2) is fully located inside the housing (3), and in a second open position, one end (11, 21) of the sliding element (1, 2) protrudes through the opening (31, 320), outside the housing (3), wherein the end (11, 21) of the sliding element (2, 3) is equipped with a indent (12, 22) for placing the small treats, wherein the sliding elements (1, 2) are normally aligned with each other and are arranged through crossing in an interaction area, wherein on/in the sliding elements (1, 2) surface structures are provided, by height and/or width, wherein the surface structures interact mechanically with each other, and the mechanical interaction can be modified by moving the sliding elements (1, 2), through which the sliding elements (1, 2) can be brought into an open position, with the indents (12, 22) located outside the housing (3).

26 Claims, 8 Drawing Sheets

Figure 1:
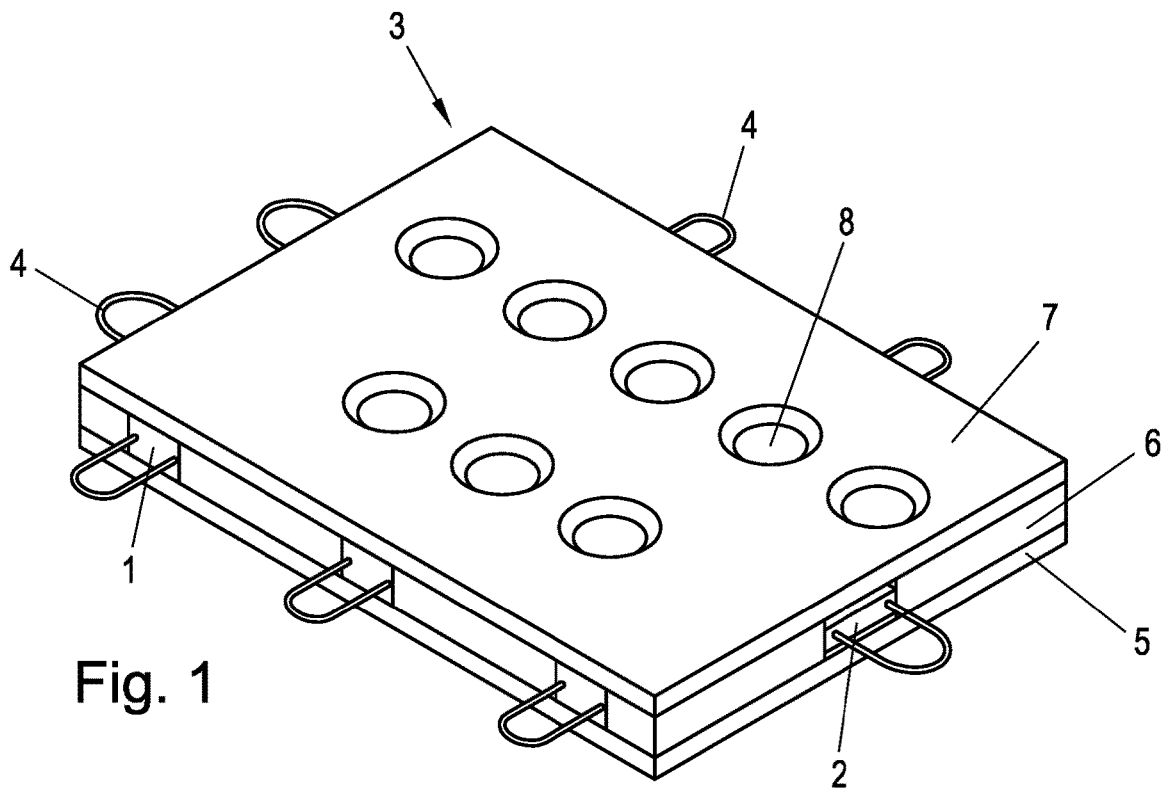

(51) Int. Cl.
  *A63F 3/00* (2006.01)
  *A63F 9/06* (2006.01)
  *A63F 9/08* (2006.01)

(52) U.S. Cl.
  CPC .......... *A63F 9/0601* (2013.01); *A63F 9/0803* (2013.01); *A63F 2003/00328* (2013.01); *A63F 2003/00337* (2013.01)

(58) Field of Classification Search
  CPC .......... A63F 9/0803; A63F 2003/00328; A63F 9/0601; A63F 2003/00331
  See application file for complete search history.

(56) References Cited

FOREIGN PATENT DOCUMENTS

| | | | | |
|---|---|---|---|---|
| DE | 202008016471 U1 | * | 4/2009 | ........... A01K 15/025 |
| GB | 2488379 A | * | 8/2012 | ........... A01K 15/025 |
| WO | WO-2011034486 A1 | * | 3/2011 | ........... A01K 15/025 |
| WO | WO-2012040751 A1 | * | 4/2012 | ............ A01K 5/0114 |
| WO | WO-2014081376 A1 | * | 5/2014 | ............. A01K 15/02 |
| WO | WO-2017147633 A1 | * | 9/2017 | ........... A01K 15/025 |

* cited by examiner

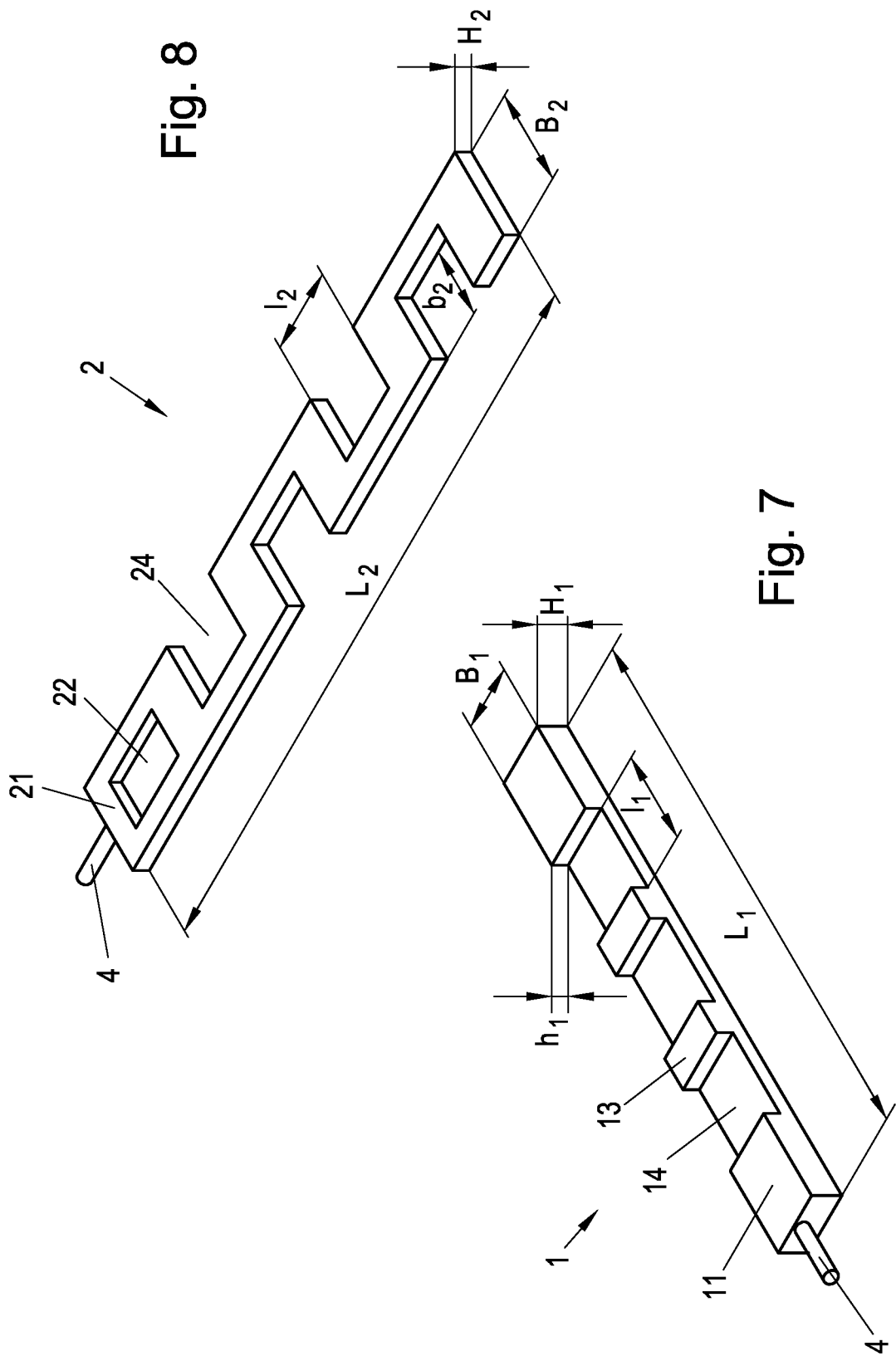

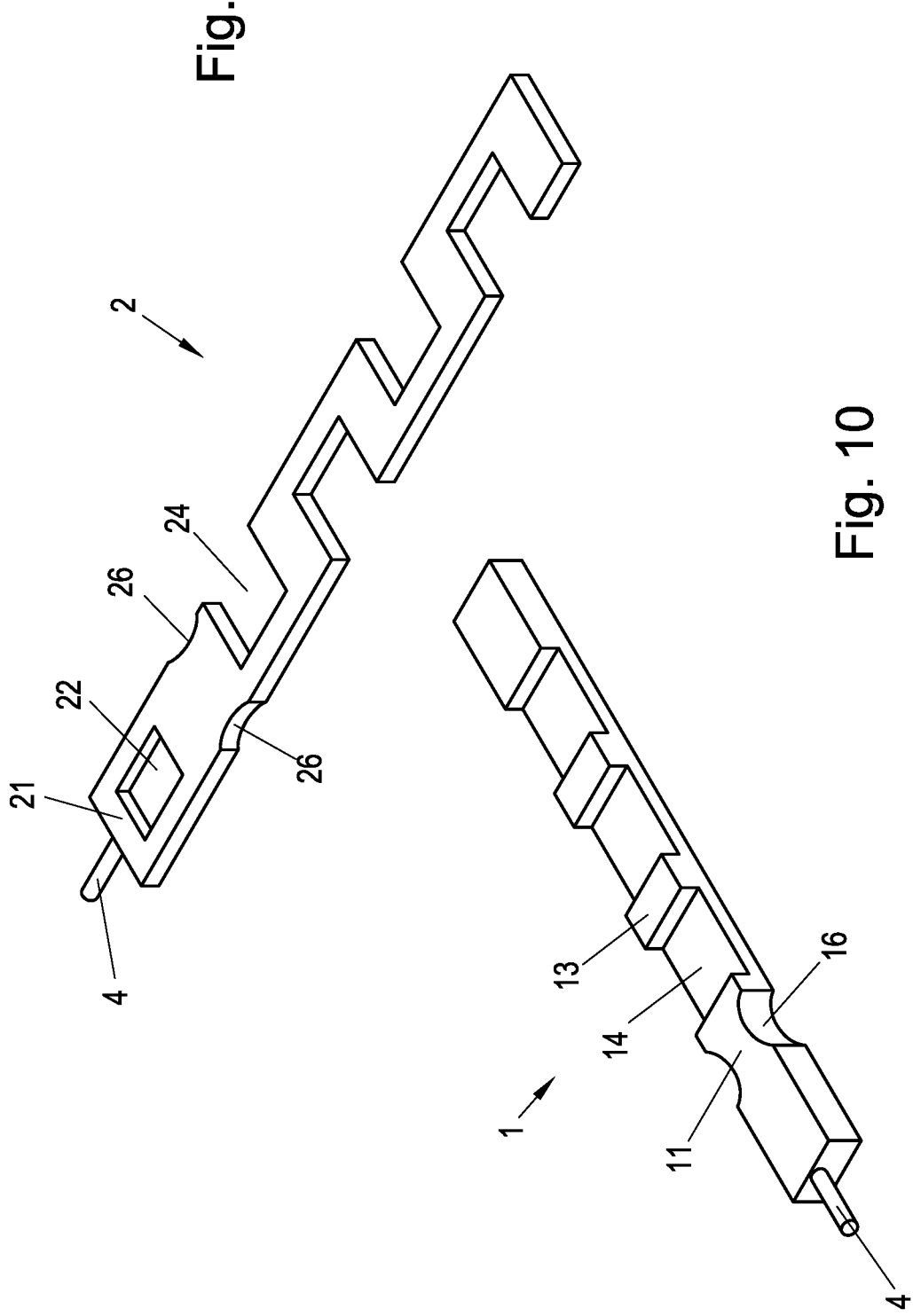

TOY FOR DOMESTIC PETS

CROSS REFERENCE TO RELATED APPLICATIONS

This application is a national phase of PCT/AT2018/060243 filed on Oct. 15, 2018, which claims the benefit of A 50567/2018, filed Jul. 2, 2018, both of which are incorporated by reference herein in their entirety.

The invention refers to a toy for pets, according to the generic term of the claim of patent 1.

A large number of toys for pets, in particular for dogs, are known from the prior art. Offering domestic animals the possibility of experimenting with a variety of toys requires constantly developing new toys. This means creating new challenges. The intelligence and memory of the pet need to be especially promoted.

Despite the fact that there are many such toys for humans, since humans usually have far better motor skills than animals, these toys often require a high degree of accuracy in operation. For this reason, they are not appropriate for animals. Toys for animals must also be able to withstand strong, jerky and undirected movements. In order to make such toys, which require differentiated movements, accessible to animals, aside from the memory and intelligence of animals, their motor skills should also be promoted.

The object of the invention is therefore to provide a toy for pets that is stable and at the same time requires precise operation in order to improve the pet's motor skills. In order to motivate the pet to exercise, a toy stimulus should also be created. The memory and intelligence of the pet should also be improved.

The invention solves this task through the distinctive characteristic of the claim of patent 1.

For a toy comprising a housing with a floor, a lid and side walls with openings, where in the housing there is a longitudinal sliding element and at least one transversal sliding element, wherein in a first closed position the sliding element is arranged completely inside the housing, and in a second open position the end of the sliding element protrudes from the housing through the opening, it is provided, according to the invention, that the end of the sliding element is provided with an indent for retrieving small treats, and the sliding elements are normally aligned with each other, and are arranged by intersection in an interaction area, wherein surface structures are provided on/in the sliding elements, by height and/or width, wherein the surface structures are mechanically interacting with each other and the mechanical interaction can be modified by moving the sliding elements, and so the sliding elements can be brought into open position, with the indents located outside the housing.

The sliding elements can be moved along a movement path on one direction of movement, so that they can be pulled out of the housing and pushed into the housing.

The height of a sliding element can be assumed to be the vertical extension from the floor. The width is considered to be the parallel extension from the floor and transversal to the direction of movement. The length of a sliding element is determined by its extension parallel to the floor and parallel to the direction of movement.

The system according to the invention provides a stable toy that requires precise operation. This way the pet's motor skills can be improved. The possibility of placing small treats in the indents provides a toy stimulus for the pet. The mechanical interaction ensures that the sliding elements cannot be moved randomly from one end to the other. This helps improve the pet's memory.

Other beneficial properties are presented in the corresponding claims.

The toy can be made particularly stable if the sliding elements are made from one piece and the surface structures are formed integrally. Thus, the surface structures are generated by the differences in height perpendicular to the floor and, alternatively or additionally, by differences in width parallel to the floor and perpendicular to the direction of movement.

A particularly simple option for designing the surface structures can be achieved through the fact that the longitudinal sliding elements have differences in height and the transverse sliding elements have differences in width, noting that the differences in width normally appear in relation to the direction of movement of the transverse sliding elements. For example. For example, through differences in height, passages can be formed and through differences in width recesses can be formed.

In order to challenge the pet's memory even further, more longitudinal sliding elements can be provided. Alternatively or additionally, the toy's difficulty level can be increased if more transversal sliding elements are provided.

In order to challenge the pet's memory and intelligence even further, a succession of the sliding elements, enabling a movement, can be provided. For this, it can be provided that the longitudinal sliding element, as surface structure, should be provided with at least one passage, in which the transversal sliding element is arranged in a movable manner, and that the transversal element, as surface structure, should have at least one recess, which in the open position of the transversal sliding element, should be located in the interaction area. Thus, in the open position of the transversal sliding element, the longitudinal sliding element can be brought into open position. Therefore, it can be specified that all transversal sliding elements must first be brought into open position, before the longitudinal sliding elements can be brought into open position. Furthermore, it is possible to arrange the passages and recesses in a manner enabling the establishment of a clear succession for the movement of sliding elements.

In order to have a particularly simple and stable option for designing a complex toy, it can be provided that it should have at least two longitudinal sliding elements that are aligned parallel to each other. Thus, the longitudinal sliding elements can be advantageously designed in the same manner. In this case, the number of passages in the longitudinal sliding elements advantageously corresponds to the number of transversal sliding elements.

In order to obtain a particularly stable embodiment, it can be provided that the passage should have a passage height lower than the height of the longitudinal sliding element. The passage can be delimited laterally by at least one block, which in particular has the height of the longitudinal sliding element. Thus, it can be provided that the passage height corresponds at least to the height of the transverse sliding element, in particular it can be provided that the passage height corresponds exactly to the height of the transverse sliding element. In order to avoid the possibility of the sliding elements getting stuck, it can be provided that the edges of the blocks are rounded.

A simple way of establishing the sequence for shifting the sliding elements can be achieved if the recess has a smaller width than the width of the transverse sliding element, with the particular provision that the block should be placed in the recess in the open position of the longitudinal sliding element. This will result in a particularly stable design.

If the passage is equipped with a passage length corresponding to the width of the transversal sliding element on the longitudinal sliding element's direction of movement, the pet should exhibit a high level of precision. This can help improve the pet's motor skills, as well as prevent the jamming of the sliding elements inside the housing.

It would be structurally advantageous if the recess would have, on the transversal sliding element's direction of movement, a recess length corresponding to the width of the longitudinal sliding element. This arrangement can also help prevent the jamming of the sliding elements. Therefore, it would be particularly advantageous for the corners of the recess to be rounded. This can further help in the prevention of jamming.

The toy is particularly stable when the width of the transverse sliding element is greater than the width of the longitudinal sliding element, the width of the recess corresponding, in particular, to the width of the longitudinal sliding element.

In order to make the toy even more challenging for the pet, it can be provided that the longitudinal sliding elements should be placed in the longitudinal openings, the longitudinal openings being located in the opposite side walls of the housing. Alternatively or additionally, it can be provided that the transversal sliding elements should be located in the transversal openings, which are, in particular, located in the opposite side walls of the housing.

In order to obtain a particularly stable embodiment with little constructive effort, it can be provided that transverse sliding elements, which are arranged in transverse openings on opposite sides, are mirror-symmetrical to one another.

In order to make the toy even more difficult for the pet, it can be provided that the longitudinal openings, through which the neighbouring longitudinal sliding elements exit the housing, should be placed on opposite side walls. Alternatively or additionally, it can be provided that the transversal openings through which the neighbouring transversal sliding elements exit the housing should be placed on opposite side walls.

In order to make the toy particularly stable, it can be provided that the inside of the housing should be provided with at least one guide rail, on the floor, and that the transversal sliding element should be equipped with a corresponding pin, where the ends, namely the open and/or closed position of the transversal sliding element are provided by the guide rail. This prevents the transverse sliding elements from being pulled completely out of the housing.

In order to prevent the jamming of the sliding elements inside the housing, it can be provided that guide elements should be installed on the floor inside the housing, in particular having the guide elements arranged between the sliding elements. In order to further avoid jamming, it can be provided that the guide elements should have rounded corners and/or edges. Therefore, the floor guide elements limit the lateral movement path of the sliding elements.

The jamming of the sliding elements can also be avoided when, inside the housing, the guide elements are placed on the lid, especially when the guide elements are disposed parallel to the longitudinal sliding element. Thus, jamming can be easily avoided if the distance of guide elements corresponds to the width of longitudinal sliding elements. Furthermore, it can be provided that the guide elements placed on the lid should have rounded corners and/or edges.

Therefore, due to the guide elements installed on the lid, the movement path of the longitudinal sliding elements will be laterally limited.

In order to easily determine if a sliding element is placed in an open position, it can be provided that the lid should be provided with a sight, and that a mark should be applied on at least one sliding element. Thusly, in one of the end positions, especially in the open one, the mark can be seen through the sight. Furthermore, this can stimulate the pet owner to play the toy with his pet.

Furthermore, it can be provided that the mark should be provided on at least one longitudinal sliding element, and in particular on all longitudinal sliding elements. This may help easily establish if all sliding elements are in an open position and that all recesses are located outside the housing. This way it can be established whether or not the pet can access the small treats inside the recesses. This helps avoid having small treats left inside the toy at the end of the toy.

In order to easily operate the sliding elements, it can be provided that the sliding elements should be equipped with handles protruding outside the housing in the closed position of the sliding elements. Ropes or rods, for example, can be provided as handles.

In order to simplify operation, it can be provided that at least one blocking elements is included, so that an obstacle is overcome when arranging the sliding element into open position, in order to bring the sliding element into closed position. The obstacle is selected so that it is overcome through an operation parallel to the sliding element's direction of movement, while preventing, at the same time, the movement of the sliding element upon an undirected contact. If, during the toy, the sliding element has already been brought into open position once, the sliding element will be thus maintained in this open position, and the mechanical interaction will also be maintained, in order to avoid the jamming of the sliding elements in an intermediary position. In order to bring the sliding elements back into a closed position at the end of the toy, the obstacle can be overcome through a targeted operation. The toy can thus be simplified for unpractised pets.

The blocking element can be designed in a particularly simple and robust manner if a particularly curved spring is provided as the blocking element, and if the sliding element has a corresponding, in particular curved, groove. The spring is thus designed to be outside of the movement path of the sliding element. When the sliding element is brought into open position, the blocking of the spring creates a noise in the groove. This indicates to the playing animal that the sliding element does not have to be moved any further in order to solve the toy and get all the little treats.

It can be provided that the blocking element should be located on a guide element installed on the floor. This makes the toy very stable. If the blocking element is arranged adjacent to the opening, the functional efficiency of the blocking element can be more easily verified. Furthermore, the blocking element can be replaced, if necessary, or removed if the pet gains experience. Additionally or alternatively, it can also be provided that the blocking element should be placed on the side wall.

The operation of the toy is simplified when providing a blocking element at least for the transversal sliding element, in particular at least for all transversal sliding elements. This way, the jamming of the sliding elements can be avoided.

The operation of the toy is further simplified when providing a blocking element at least for the longitudinal sliding element, in particular at least for all longitudinal sliding elements. The jamming of sliding elements can thus be avoided, and the toy can also be easily used by unpractised animals.

In order to increase the difficulty level, at least one obstacle can be provided, being located in a groove oriented towards to lid, which can be accessed through the lid, in particular through the sight, thus enabling the sliding element to move only after removing the obstacle. Obstacles can also be provided for several sliding elements.

In order to stimulate the pet to complete the task, it can be provided that a small treat is placed in the groove of the sliding element, with the obstacle covering the small treat.

A particularly advantageous embodiment is, for example, presented based on the following drawings, without limiting the general innovative idea.

FIG. 1 presents a toy in the closed position of the sliding elements.

Figure 2:
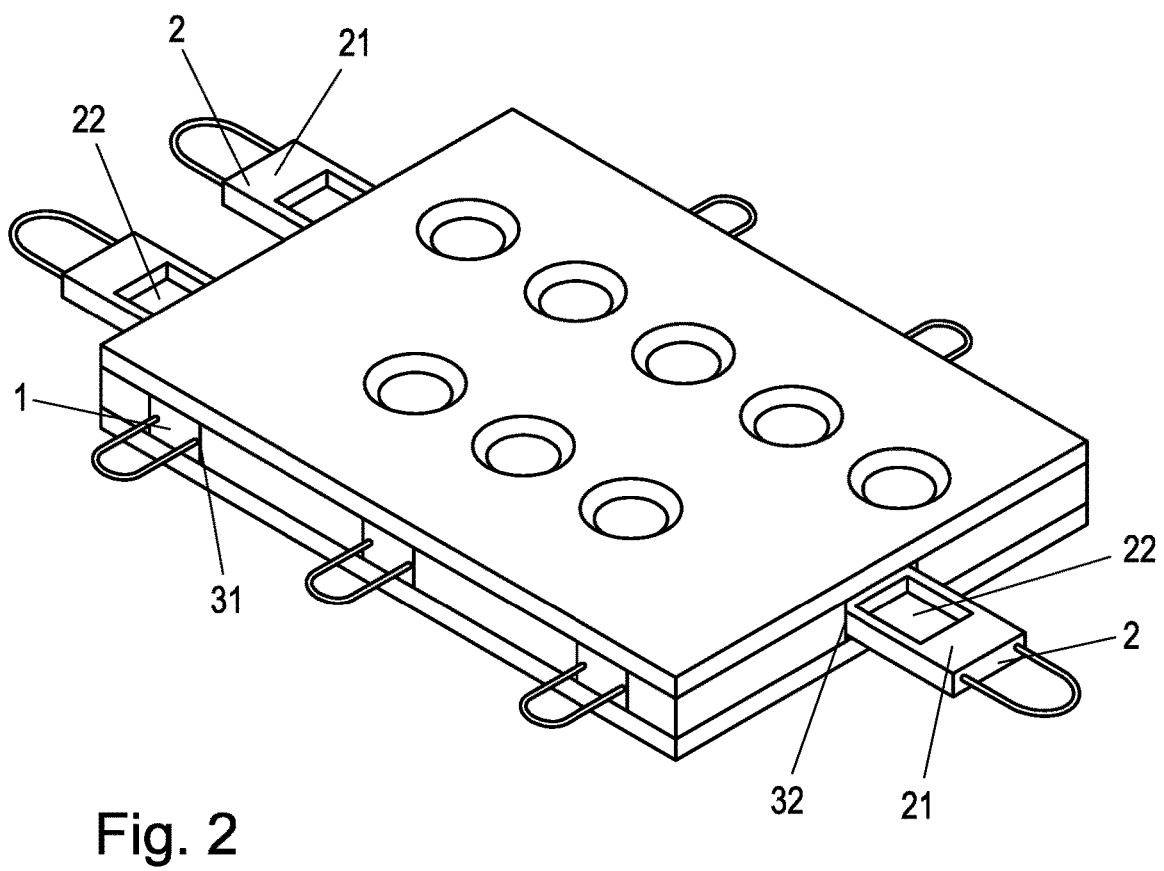

FIG. 2 presents the embodiment in FIG. 1 with the transversal sliding elements in closed position.

Figure 3:
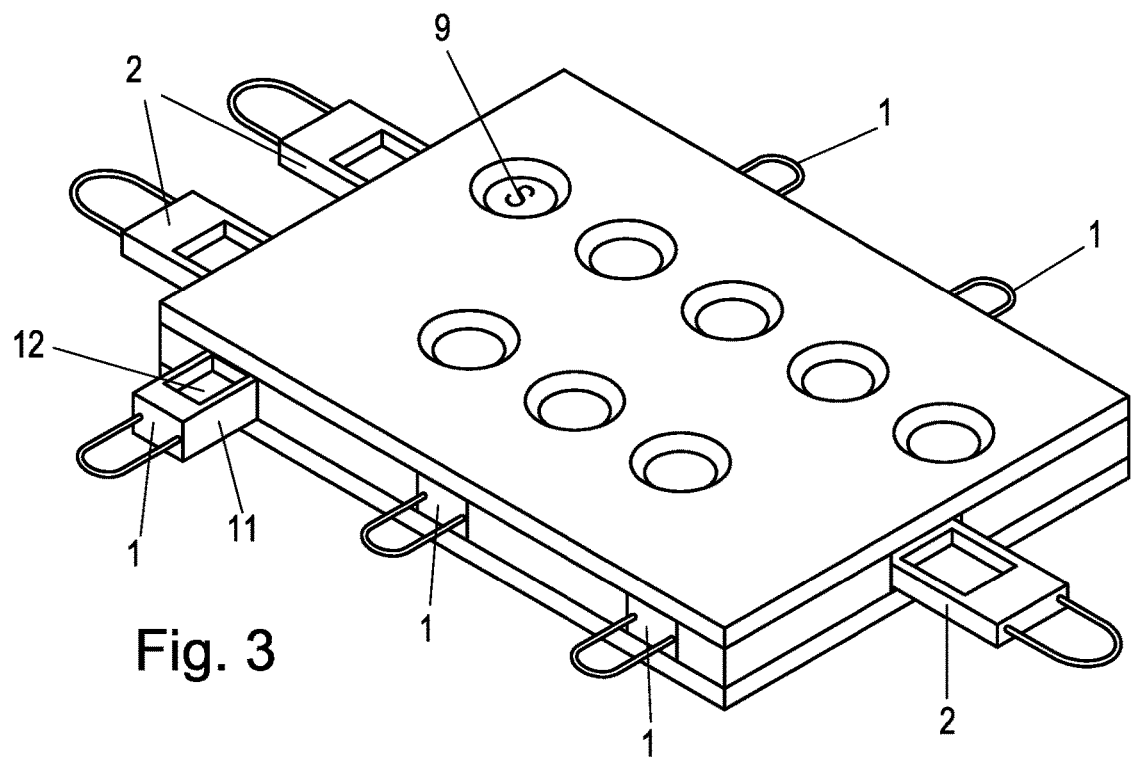

FIG. 3 presents the embodiment in FIG. 1 with one additional longitudinal sliding element in open position.

Figure 4:
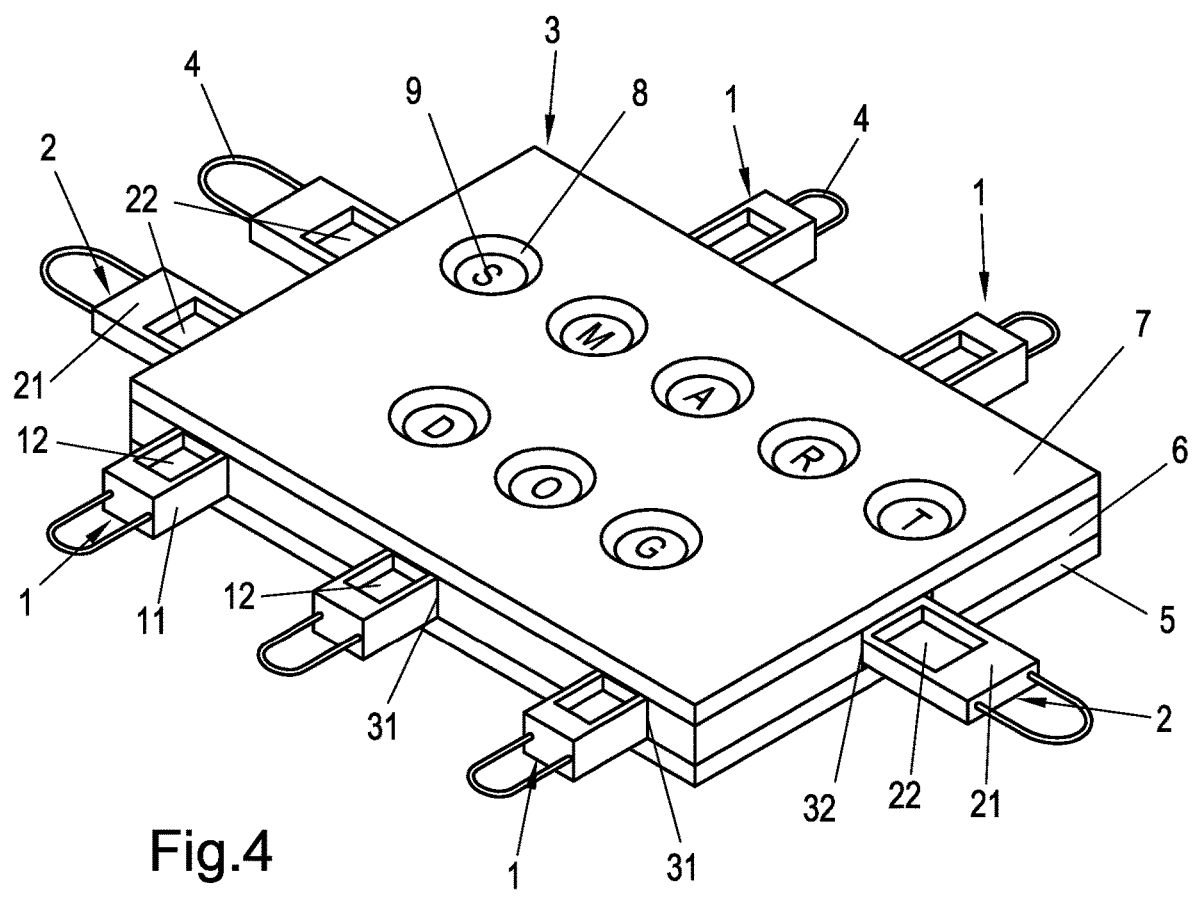

FIG. 4 presents the embodiment in FIG. 1 with all the sliding elements in open position.

Figure 5:
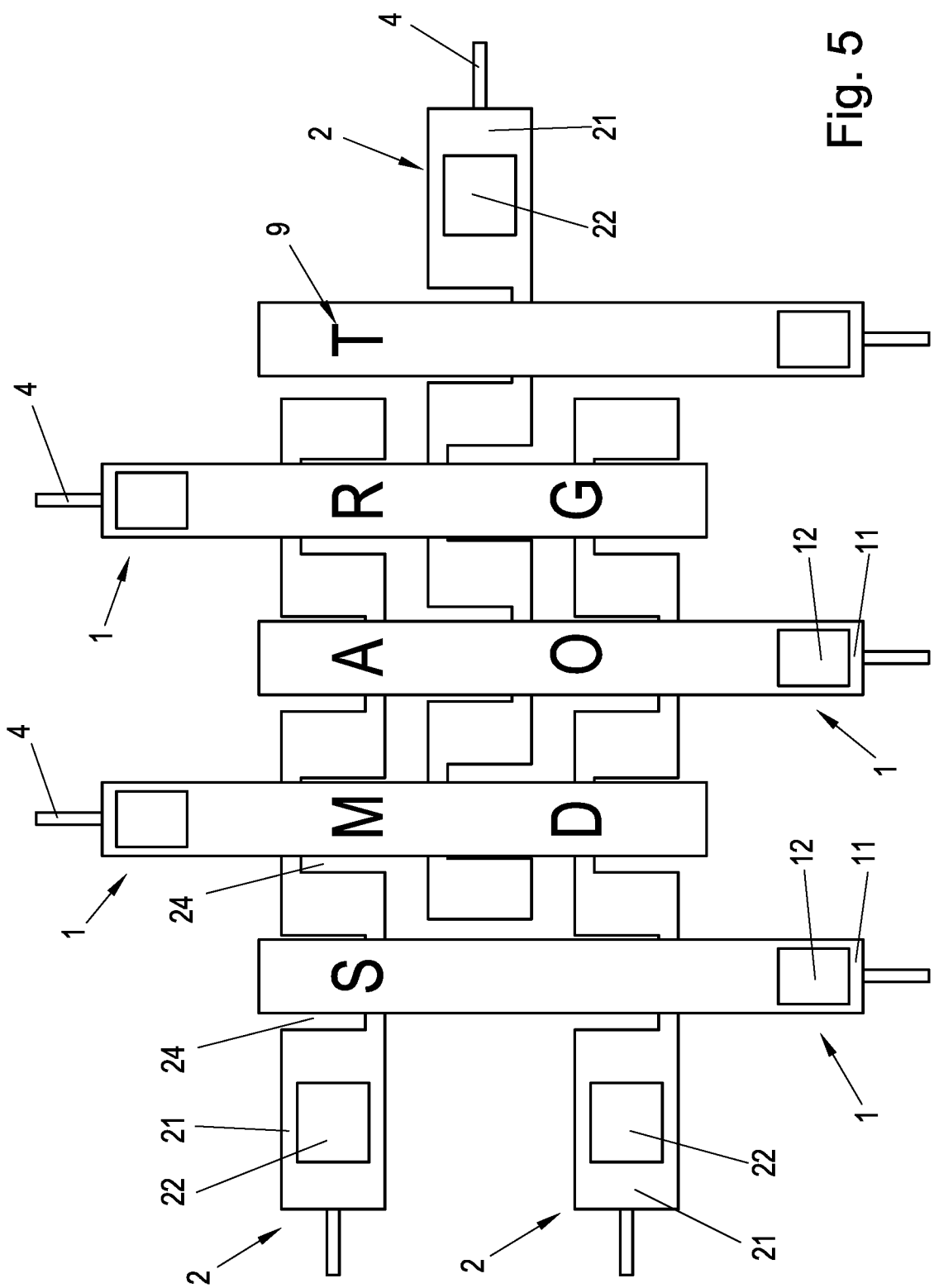

FIG. 5 presents the sliding elements in open position as seen from above.

Figure 5A:
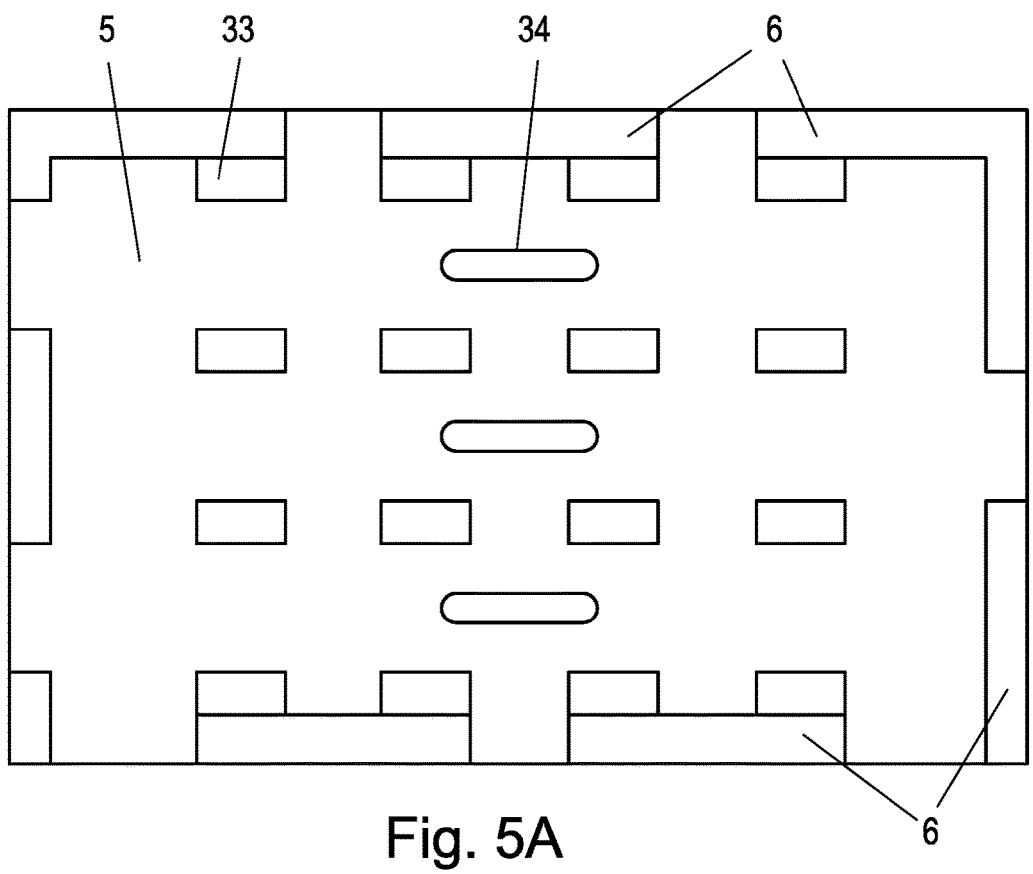

FIG. 5*a* presents the floor, as seen from above, inside the housing.

Figure 6A:
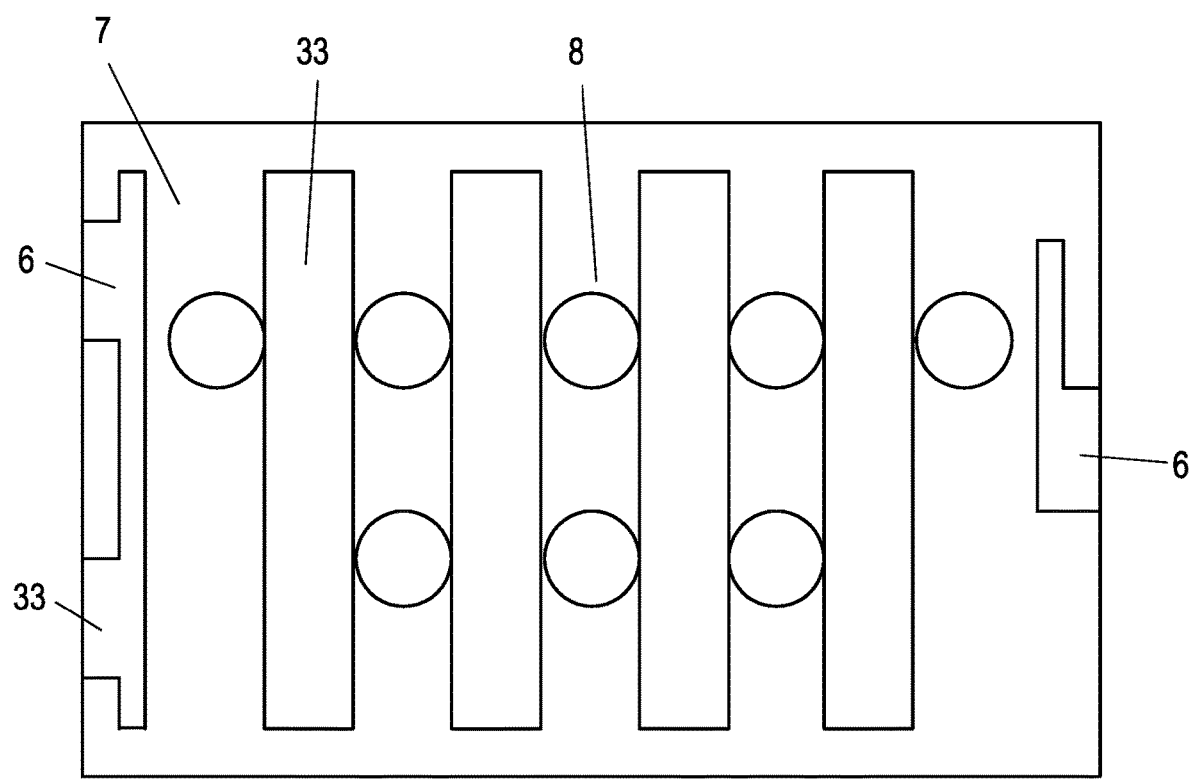
Figure 6:
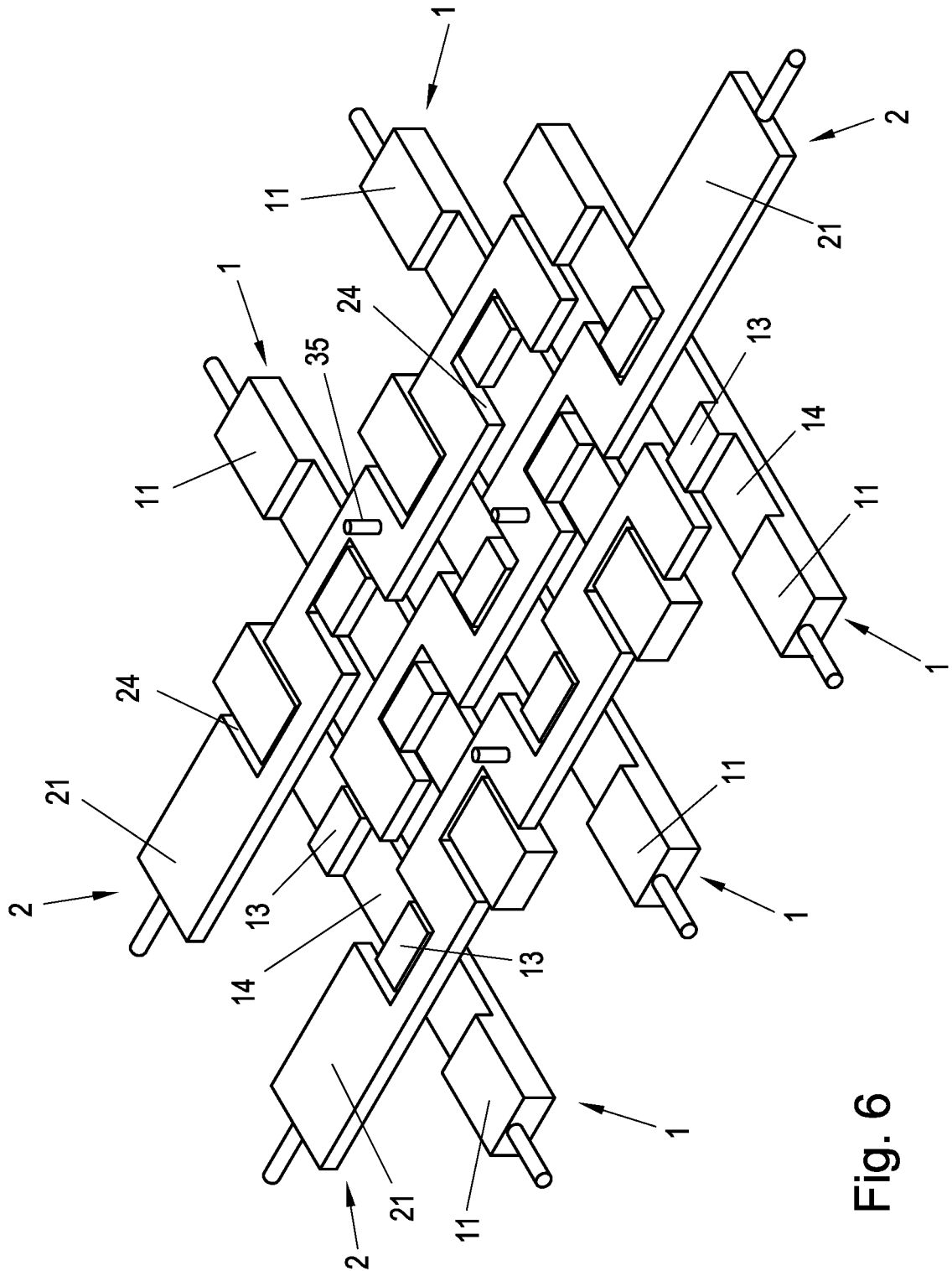

FIG. 6 presents the sliding elements in open position as seen from below.

FIG. 6*a* presents the lid of the housing, as seen from inside the housing.

FIG. 7 presents a longitudinal element from the presented embodiment, as seen from below.

FIG. 8 presents a transversal element from the presented embodiment, as seen from above.

Figure 9:
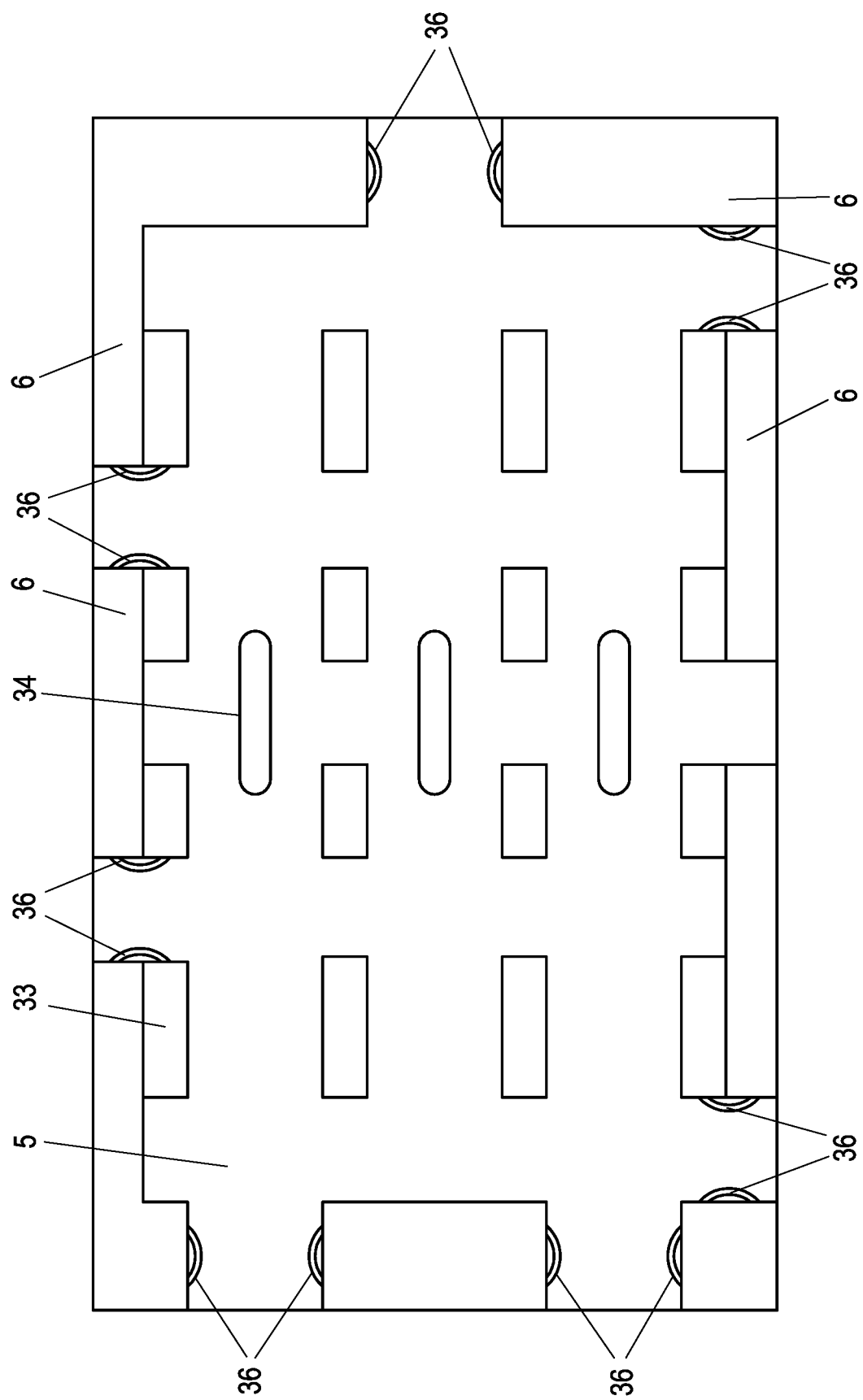

FIG. 9 presents the floor with the blocking elements as seen from above.

FIG. 10 presents a longitudinal sliding element with grooves.

FIG. 11 presents a transversal sliding element with grooves.

FIG. 1 presents an exemplary embodiment of a toy. The toy comprises a housing, with a floor 5, and a lid 7 and the side walls 6 placed between the floor 5 and the lid 7. The side walls 6 are provided with the openings 31, 32, in which the sliding elements 1, 2 are placed. All sliding elements 1,2 are fully placed inside housing 3 and are in closed position. The sliding elements 1,2 are equipped with handles 4, which protrude outside the housing 3. The handles 4 are designed as strings. The toy illustrated presents three transversal sliding elements 2. Furthermore, five longitudinal sliding elements are provided.

FIG. 6 indicates that the transversal sliding elements 2 are located in the transversal openings 32. In the illustrated embodiment, the adjacent longitudinal openings 31, and the adjacent transversal openings 32, respectively, are located in opposite side walls 6. In the preferred, illustrated embodiment, the toy is made of wood. However, other appropriate materials can also be used.

The sliding elements 1,2 are illustrated in detail in FIGS. 7 and 8. In this embodiment, ropes are provided as handles 4.

FIG. 7 presents a longitudinal sliding element 1 as seen from below. On the longitudinal sliding element 1, a handle 4 is placed. At the end 11 directed towards the handle, a recess 12 for small treats is provided in the upper part, and thus it cannot be seen in FIG. 7.

The longitudinal sliding element 1 presents height differences as surface structure. The height needs to be interpreted as the extension perpendicular to the floor 5. By the height differences between the height H1 of the longitudinal sliding element 1 and the areas with the height of passage h1, in the illustrated embodiment, three passages 14 are formed.

The passages 14 are crossing the entire width B1 of the longitudinal sliding element 1. Therefore, width B1 is any extension that is parallel to the floor 5 and usually on the direction of movement. The length L1 of the longitudinal sliding element 1 is the extension parallel to the floor 5 and parallel to the direction of movement. The passages 14 present a passage length l1 which corresponds to the extension along the length L1. Thus, the length of the passages l1 is a segment of the length L1 which represents the entire length of the longitudinal sliding element 1. In their passage length l1, these 14 are delimited by the blocks 13. In the area of the blocks 13, the longitudinal sliding element 1 has a H1 height. In another embodiment, it can be provided that the corner areas are to be rounded, in order to better avoid jamming.

In the presented embodiment, the passage length l1 corresponds to the width of the transversal sliding element 2. The transversal sliding element 2 is illustrated in FIG. 8. The transversal sliding element 2 has as surface structures width differences. The width B2 of the transversal sliding element 2 is the extension parallel to the floor 5 and usually on the direction of movement. The surface structures of the transversal sliding element 2 are not formed by areas of different height, therefore the height H2 of the transversal sliding element 2 is uniform in the interaction areas. The height H2 of the transversal sliding element 2 is determined by the extension perpendicular on the surface of the floor 5. The length L2 of the transversal sliding element 2 is the extension parallel to the floor 5 and parallel to the direction of movement. In the illustrated embodiment, recesses 24 are formed through the differences between the entire width B2 of the transversal sliding element 2 and the smaller width of the recess b2. In another embodiment it is provided that the corner areas are rounded, in other to better avoid jamming.

In the illustrated embodiment, the recess width b2 approximately corresponds to the length of end 11. This way, when the longitudinal sliding element 1 moves, the end 11 can move in the recess 24 in housing 3. Therefore, the grooves 12 provided at end 11 can be moved outside housing 3.

The illustrated embodiment comprises four recesses 24. The adjacent recesses 24 are thus disposed on the opposite sides of the transversal sliding element 2. As a result, the recesses 24 are provided in different directions. The recesses 24 have a recess length l2, which represents a segment of the total length L2 of the transversal sliding element 2. In the illustrated embodiment, the length of the recess l2 corresponds to the width B1 of the longitudinal sliding element 1. Since the transversal sliding element 2 needs to be viewed from above, in the end 21 directed towards handle 4, a small indent 22 housing the small treats needs to be provided.

FIG. 5 and FIG. 6 present the sliding elements 1, 2, as they interact during the toy. The illustrated embodiment provides three transversal sliding elements 2 and five longitudinal sliding elements 1. The longitudinal sliding elements 1 and the transversal sliding elements 2 are normally arranged one in front of the other, and interact in the interaction area. The adjacent sliding elements 1,2 are provided in opposite directions. Ends 12, 22 and the handles 4 are thus arranged in turn, in opposite sides.

FIG. 6 presents the manner in which the longitudinal sliding elements 1 and the transversal sliding elements 2 can interact mechanically. FIG. 6 presents the sliding elements 1,2, in their open position in the toy. Thus, the sliding elements 1, 2 are illustrated as they are designed in the toy, as seen from below. The illustration also presents a view of the sliding elements 1,2, from floor 5 to lid 7, from above. The transversal sliding elements 2 are placed in the passages 14 of the longitudinal sliding elements 1. The blocks 13 of the longitudinal sliding elements are placed in the recesses 24 of the transversal sliding elements 2. It is specified that in this interaction, the transversal sliding elements 2 must first be moved through the passages. This way, the recesses 24 of the transversal sliding elements 2 are brought into the interaction area. Subsequently, the longitudinal sliding elements 1 can be moved, provided that the blocks 13 are arranged in the recesses 24 of the transversal sliding elements 2. This way, all ends 11, 21 can be brought to a position that is located outside the housing 3, so that the indents 12, 22 are located outside the housing 3.

This can be seen in FIG. 5, because here the toy can be viewed from above. FIG. 5 also indicates that in the illustrated embodiment, the marks 9 are applied on the longitudinal sliding elements 1. The marks 9 can be placed in the sight 8.

FIG. 6a presents the lid 7 of housing 3 inside the housing 3, as seen from the outside. Marks 9 will be visible through the sight 8, in the closed position of the longitudinal sliding elements 1. Subsequently, all the transversal sliding elements 2 must be open, and only after that can the longitudinal sliding elements be open. The marks 9 on the longitudinal sliding elements 1 can thus determine if all indents 12, 22 are arranged in an open position outside the housing 3.

The illustrated embodiment provides five longitudinal sliding elements 1. The longitudinal sliding elements 1 are arranged parallel to each other. The design of the longitudinal sliding elements 1 is the same for all the longitudinal sliding elements 1. Three passages 14 are provided for each. The number of passages 14 corresponds to the number of transversal sliding elements 2.

The transversal sliding elements 2 are also arranged parallel to each other. Through the arrangement of the transversal sliding elements 2, and of the ends 22 and handles, respectively, it is specified that the adjacent 2 transversal sliding elements on the opposite sides of the housing 3 can protrude outside of the housing 3. The transversal sliding elements 2 whose handles are provided in the same direction, and which have the same direction of movement, are designed in the same manner.

The middle transversal sliding element 2, whose handle 4 is illustrated in the opposite direction and which has an opposite direction of movement, is mirror-symmetrical to both exterior transversal sliding elements 2. In the open position of all transversal sliding elements 2 the recesses 24 of the adjacent transversal sliding elements 2 are arranged side by side. Thus, the recesses 24 are arranged in a line, perpendicular to the direction of movement. All recesses 24 in a line open to the same direction. This way the longitudinal sliding elements 1 can move along a line. This way the lines form the movement path for the longitudinal sliding element 1.

The longitudinal sliding elements 1 are also arranged so that the longitudinal sliding elements 1 on the opposite sides can protrude outside the housing 3. The recesses 24 of the transversal sliding elements 2 arranged in such a manner that, if they are located in the interaction area, they are far from the handles 4 of the longitudinal sliding elements. This means that the recesses 24 are closed towards the longitudinal opening 31. Since the handles of the longitudinal sliding elements 1 are provided on the opposite sides, the recesses 24 of the transversal sliding elements 2 are also provided on opposite directions. This way, the recesses are arranged alternatively along the transversal sliding elements 2, on various sides of the transversal sliding elements 2.

FIG. 6 shows that the transversal sliding elements 2 are equipped with studs in their middle. These studs 35 prevent the transversal sliding elements 2 from being completely removed from the housing 3.

FIG. 5 shows the floor 5 of the housing 3, as plan view from the inside of the housing 3 towards the outside. In the middle, the guide rails 34 serving in accommodating the studs 35, are arranged. When the transversal sliding elements 2 move between the end positions, the studs move along the guide rails 34. This ensures an exact operation, while also ensuring high stability. Stability is also ensured by the guide elements 33 installed on the floor 5. In the illustrated embodiment, the guide elements 33 consist of small wood chips. Therefore, the guide elements 33 are areas inside the housing 3, where the floor 5 has an additional height. In another embodiment, it can be provided that the corner areas of the guide elements 33 should be rounded, in order to better prevent jamming.

FIG. 6a indicates that other guide elements 33 are installed on the lid 7. The guide elements 33 on the lid 7 of the housing 3 consist of wooden slats. The distance between the guide elements 33 corresponds to the width B1 of the longitudinal sliding elements 1. The width of the guide elements 33 indicates the distance between the longitudinal sliding elements 1, thus providing an exact guide of the longitudinal sliding elements 1 into the housing 3. The height of the guide elements 33 on the lid of the housing corresponds to the difference in height between height H1 and the passage height h1.

FIGS. 1 through 4 show an embodiment of the toy in various positions of the sliding elements 1, 2. FIG. 1 all the sliding elements 1,2 are arranged in closed position, completely inside the housing 3.

In FIG. 2 the transversal sliding elements 2 are pulled out of the housing 3, so that the ends 21 protrude out of the housing 3. The indents 22 for the small treats are thus located outside the housing 3. In the illustrated embodiment, the first longitudinal sliding element 1 can be brought into open position only after all the transversal sliding elements 2 are in the open position. The succession in which the longitudinal sliding elements 1 are brought into open position is not predetermined.

FIG. 3 indicates, in relation to a longitudinal sliding element 1, the fact that, in the open position, the longitudinal sliding element 1, the end 11 of the longitudinal sliding element 1 protrudes out of the housing 3. In the open position of the longitudinal sliding element 1, a marking 9 can be seen in the sight 8 of the lid 7.

FIG. 4 presents the toy with all the sliding elements 1,2 in open position. All the indents 12, 22 are located outside the housing 3. This is also clearly signalled by the markings 9 which can be seen through the sights 8 of the lid 7. Thus, all the small treats can be removed from the indents 12, 22 and it can be checked whether there are any small treats remaining down there after the toy is completed.

In an alternative embodiment, the toy can be provided with obstacles extending through the lid 7 and which are located in the grooves of the sliding elements 1,2. The grooves are located in the sliding elements 1, 2, oriented towards the lid 7. The obstacles can then prevent the movement of the sliding elements 1,2. The obstacles can, for example, be installed in the sights 8 which extend through the lid 7.

If the obstacles are installed in the sights 8, they prevent the longitudinal sliding elements 1 from moving. This means that the obstacles must first be removed, by pulling them outside, before the longitudinal sliding elements 1 can move. It can be provided that the small treats should be inserted in grooves, and that the obstacles should cover the small treats. This makes the toy more difficult for the animals, but at the same time, it creates an additional motivation.

FIG. 9 presents an alternative embodiment, which comprises blocking elements, so that an obstacle needs to be overcome in order to bring the sliding elements 1,2 from a closed position to an open position. In the illustrated embodiment, for all sliding elements 1,2, namely all longitudinal sliding elements 1, and all transversal sliding elements 2, two blocking elements are provided. In the non-illustrated embodiments, a blocking element can be provided for each sliding element 1,2, or blocking elements can only be provided for the longitudinal sliding elements 1, or only for transversal sliding elements 2 or only for individual sliding elements 1,2.

In the illustrated embodiment, blocking elements are executed as arched springs 36. The springs 36 are installed on the guide elements 33, which are located on the floor 5 and arranged on the side wall 6, through which they protrude outside, on the movement path of the sliding elements 1,2. For this purpose, the arches are 36 arranged adjacent to the openings 31, 32.

FIG. 10 indicates a longitudinal sliding element 1 for the embodiment in FIG. 9. The longitudinal sliding element 1 is provided with two grooves 16 which correspond to the arched springs 36. The grooves 16 are arranged on the longitudinal sliding element 1, so that the springs 36 close the grooves 16, if the longitudinal sliding element 1 has been brought to an open position. For this purpose, the grooves 16 are much further away from the handle 4 than the indent 12. The springs 36 are therefore located in the grooves 16 if the indent 12 is located outside the housing 3. Upon closing, a noise is produced, confirming that a longitudinal sliding element 1 is now in its open position. In order to bring the longitudinal sliding element 1 from this open position into closed position, the obstacle of the springs 36 needs to be overcome.

FIG. 11 presents a transversal sliding element 2 for the embodiment in FIG. 9. The transversal sliding element 2 presents two grooves 26 which correspond to the arched springs 26. The grooves 26 are located on the transversal sliding element 2, so that the springs 36 close the grooves 26, if the transversal sliding element 2 was brought into open position. For this purpose, the grooves 26 are located further away from the handle 4 than the indent 22. The springs 36 are also located in the grooves 26, if the indent 22 is located outside the housing 3. Upon closing, a noise is produced, confirming that the transversal sliding element 2 is now in an open position. In order to bring the transversal sliding element 2 from this open position into a closed position, the obstacle of the springs 36 needs to be overcome. This prevents the sliding elements 1,2 from accidently moving from the open position.

The invention claimed is:

1. A toy for pets, comprising a housing (3) with a floor (5), a lid (7) and side walls (6) with openings (31, 32) through which, in the housing (3), at least one longitudinal sliding element (1) and one transversal sliding element (2) are placed in a movable manner, wherein, in a first closed position, the sliding element (1, 2) is fully located inside the housing (3), and in a second open position, an end (11, 21) of the sliding element (1, 2) protrudes through the opening (31, 320), outside the housing (3), characterised in that the end (11, 21) of the sliding element (2, 3) is provided with an indent (12, 22), for housing small treats, the sliding elements (1, 2) being normally aligned one towards the other, and are arranged through crossing in an interaction area, wherein on or in the sliding elements (1, 2) surface structures are provided, by height, width, or height and width, wherein the surface structures interact mechanically with one another, and the mechanical interaction can be modified by moving the sliding elements (1, 2), wherein the sliding elements (1, 2) can be brought in an open position, where the indents (12,22) are locate outside the housing (3) and wherein the longitudinal sliding element (1) presents height differences (H1, h1) and the transversal sliding element (2) presents width differences (B2, b2), the width differences (B2, b2) being normally formed in the direction of movement of the transversal sliding element (2).

2. Toy according to claim 1, characterized in that at least one of: the surface structures are fully formed by the height differences (H1, h1) perpendicular on the floor (5) and the width differences (B2, b2) parallel to the floor (5).

3. Toy according to claim 1, wherein at least one of several longitudinal sliding elements (1) and several transversal sliding elements (2) are provided.

4. Toy according claim 1, characterized in that the longitudinal sliding element (1) presents as surface structure at least one passage (14), in which the longitudinal sliding element (2) is installed in a movable manner, and wherein the transversal sliding element (2) presents as surface structure at least one recess (24), which is located, in the open position of the transversal sliding element (2), in the interaction area, so that in the open position of the transversal sliding element (2), especially in the open position of each transversal sliding element (2), the longitudinal sliding element (1) can be brought into open position.

5. Toy according to claim 4, characterized in that at least one of: at least two longitudinal sliding elements (1) are provided which are aligned in parallel and in that at least two transversal sliding elements (2) are provided, which are aligned in parallel, wherein the number of passages (14) corresponds to the number of transversal sliding elements (2).

6. Toy according to claim 4, characterized in that at least one of: the passage (14) presents a passage height (h1), which is smaller than the height (H1) of the longitudinal sliding element (1), wherein the passage (14) is laterally delimited by at least one block (13) which has the height (H1) and in that the passage height (h1) corresponds at least to one height (H2) of the transversal sliding element (2), especially that the passage height (h1) corresponds to the height (H2).

7. Toy according to claim 4, characterized in that the recess (24) has a recess width (b2) smaller than a width (2) of the transversal sliding element (2), wherein it is provided that in the open position of the longitudinal sliding element (1), the block (13) is located in the recess (24).

8. Toy according to claim 4, characterized in that the passage (14) presents, on the direction of movement of the longitudinal sliding element (1), a passage length (l1) that corresponds to the width (B2) of the transversal sliding element (2).

9. Toy according claim 4, characterized in that the recess (24) presents, on the direction of movement of the transversal sliding element (2) a recess length (I2) that corresponds at least to the width (B1) of the longitudinal sliding element (1), wherein the recess (24) presents a recess length (I2) that corresponds to the width (B1) of the longitudinal sliding element (1).

10. Toy according to claim 1, characterized in that a width (B2) of the transversal sliding element (2) is greater than a width (B1) of the longitudinal sliding element (1), wherein the recess width (b2) corresponds to the width (B1) of the longitudinal sliding element (1).

11. Toy according to claim 1, characterized in that at least one of: the longitudinal sliding elements (1) are located in the openings (31), and the openings (31) are provided on the opposite side walls (6) of the housing (3) and that the transversal sliding elements (2) are located in the openings (32), which are provided on the opposite side walls (6) of the housing.

12. Toy according to claim 1, characterized in that the transversal sliding elements (2) which are located in the openings (32) on opposite sides, are mirror-symmetrical to each other.

13. Toy according to claim 1, characterized in that at least one of: the openings (31), through which the adjacent longitudinal sliding elements (1) protrude outside the housing (3), are located on opposite side walls (6) and in that the openings (32), through which the adjacent transversal sliding elements (2), protrude outside the housing (3), are located on opposite side walls (6).

14. Toy according to claim 1, characterized in that in the interior of the housing (3), at least one guide rail (34) is installed on the floor (5), and the transversal sliding element (2) is equipped with an adequate stud and with the use of which the terminal position of the transversal sliding element (2) is predetermined by the guide rail (34).

15. Toy according to claim 1, characterized in that in the interior of the housing (3) there are guide elements (33) installed on the floor and located between the longitudinal sliding element (1) and the transversal sliding element (2).

16. Toy according to claim 1, characterized in that in the interior of the housing (3) a number of guide elements (33) are installed on the lid (7), the guide elements (33) are arranged parallel to the longitudinal sliding element (1), and in that it is provided that the distance between the guide elements (33) corresponds to the width of the longitudinal sliding element (1).

17. Toy according to claim 1, characterized in that the lid is equipped with at least one sight (8) and that on at least one of the longitudinal sliding element (1) and the transversal sliding element (2) a mark (9) is applied, and in one of the end positions, especially the open position, the mark (9) can be seen through the sight (8).

18. Toy according to claim 1, characterized in that a mark (9) is provided on at least one longitudinal sliding element (1).

19. Toy according to claim 1, characterized in that the longitudinal sliding element (1) and the transversal sliding element (2) are equipped with handles (4) which protrude, in the closed position of the longitudinal sliding element (1) and the transversal sliding element (2) outside the housing (3).

20. Toy according to claim 1, characterized in that at least one blocking element is provided, which is formed in such a manner that, upon bringing the longitudinal sliding element (1) and the transversal sliding element (2) into open position, an obstacle can be overcome, in order to bring the longitudinal sliding element (1) and the transversal sliding element (2) into closed position.

21. Toy according to claim 20, characterized in that, provided as blocking element, is a spring (36), and in that the longitudinal sliding element (1) and the transversal sliding element (2) has a corresponding recess.

22. Toy according to claim 20, characterized in that the blocking element is located on at least one of a side wall 6 and that a blocking element is located on the guide element (33).

23. Toy according to claim 20, characterized in that at least for one or more of the transversal sliding elements (2), a blocking element is provided.

24. Toy according to claim 20, characterized in that at least for the transversal sliding element (2) a blocking element is provided.

25. Toy according to claim 1, characterized in that at least one obstacle can be installed through the lid (7), and extended through a groove of the longitudinal sliding element (1) and the transversal sliding element (2) directed towards the lid (7).

26. Toy according to claim 25, characterized in that in the groove of the longitudinal sliding element (1) and the transversal sliding element (2) small treats can be placed and that the obstacle is meant to cover the small treats.

\* \* \* \* \*